May 26, 1942.  H. G. ROGERS  2,284,590
APPARATUS AND METHOD FOR FORMING PLASTIC FILM
Filed Jan. 15, 1941   3 Sheets-Sheet 1

FIG. 1

INVENTOR.
Howard G. Rogers
BY
Donald L. Brown

May 26, 1942.   H. G. ROGERS   2,284,590
APPARATUS AND METHOD FOR FORMING PLASTIC FILM
Filed Jan. 15, 1941   3 Sheets-Sheet 2

INVENTOR
Howard G. Rogers
BY
Donald L. Brown

May 26, 1942.    H. G. ROGERS    2,284,590
APPARATUS AND METHOD FOR FORMING PLASTIC FILM
Filed Jan. 15, 1941    3 Sheets-Sheet 3

INVENTOR.
Howard G. Rogers
BY Donald L. Brown

Patented May 26, 1942

2,284,590

UNITED STATES PATENT OFFICE 2,284,590

APPARATUS AND METHOD FOR FORMING PLASTIC FILM

Howard G. Rogers, Brookline, Mass., assignor to Polaroid Corporation, Dover, Del., a corporation of Delaware Application January 15, 1941, Serial No. 374,512

35 Claims. (Cl. 91—36)

This invention relates to methods of and apparatus for applying a plastic material to curved surfaces, and n. particularly to a method and apparatus for applying to the surface of a spherically curved lens a coating of a predeterminedly oriented, organic plastic.

It is one object of the invention to provide a method of forming on a surface of a spherically curved lens such as a headlight lens a coating of a transparent plastic having its molecules oriented to substantial parallelism in a predetermined direction.

Another object is to provide a method for forming such a coating and orienting the molecules therein to substantial parallelism with the traces on said surface of a multiplicity of parallel planes one of which traverses the center of said lens and the center of curvature of said surface.

A further object is to provide a method of forming such a predeterminedly oriented coating by depositing on said surface in a series of strips a multiplicity of particles of a transparent plastic of the class consisting of the linear high polymers the molecules of which contain hydroxyl groups, and simultaneously causing said particles to coalesce as they are deposited and orienting the molecules within the resulting layer or film.

A still further object is to provide a method for simultaneously forming and securely bonding to the surface of a spherically curved lens a coating comprising an organic plastic, and particularly a plastic of the class consisting of polyvinyl alcohol and polyvinyl acetal, and for orienting the molecules within said coating to substantial parallelism with the traces on the surface of said lens of a multiplicity of planes one of which traverses the center of said lens and the center of curvature of the coated surface.

A still further object is to provide apparatus for carrying out the above methods and particularly for forming an oriented coating of the above type on a spherically curved headlight lens.

Other objects and advantages will in part appear and in part be pointed out in the course of the following description of one or more embodiments of the invention, which are given as non-limiting examples, in connection with the accompanying drawings, in which.

Figure 9:
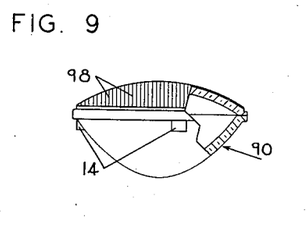
Fig. 9 is a side elevation, partly in section, of the headlight shown in Fig. 8.

This invention is in general concerned with problems in connection with the production of light-polarizing headlights for automobiles and is particularly concerned with the production of light-polarizing, spherically curved lenses such as are commonly used in automobile headlights, an example thereof being illustrated in Fig. 9. It will readily be apparent that in order for such a polarizing headlight to be practicable, it should emit plane polarized light vibrating in substantially parallel directions when viewed from a point substantially directly in front thereof. In the preferred practice, such light will be vibrating uniformly at angles of approximately 45° to the horizontal.

It will also be apparent that it is relatively simple to obtain this result in flat lenses by means, for example, of certain of the sheet polarizing materials sold under the trade name "Polaroid." However, few, if any, automobile headlights are now made with flat lenses, the great majority being of the "sealed beam" type utilizing a spherically curved lens hermetically sealed to the reflector portion. This invention is accordingly directed to the production of a spherically curved lens having the property of polarizing transmitted light in the manner above described.

Among the various types of dichroic light-polarizing materials now available, it appears that a preferred material for use in automobile headlights is a sheet or film of a transparent, linear, high polymeric plastic the molecules of which contain hydroxyl groups, and which has its molecules oriented to substantial parallelism and has incorporated therein a suitable dichroic dye or stain. This material may be prepared relatively easily in preformed sheets or films, but such sheets may not readily be bonded to or otherwise combined with the headlight lenses. Furthermore, even if such preformed sheets could be satisfactorily combined with the lenses, the molecules therein would not be properly oriented, and accordingly the polarized light emitted thereby would not be vibrating in parallel planes and could not be blocked by an ordinary analyzer.

It follows from the above discussion that the particular problem is the provision on a spherically curved lens of a suitable plastic coating wherein the molecules are oriented in substantially parallel planes when viewed in a direction substantially perpendicular to a tangent to the center of the lens. That is to say, the molecules should be oriented to substantial parallelism with the traces on the surfaces of the lens of a multiplicity of parallel planes one of which traverses both the center of the lens and the center of curvature of its surface, as, for example, in the manner indicated by lines 98 in Figs. 8 and 9. When such a coating is converted into a light polarizer, as by dyeing or staining with a dichroic dye, it will emit plane polarized light vibrating in substantially parallel planes at right angles to the planes defined by the directions of molecular orientation. The present invention provides methods and apparatus for producing this result.

Figure 1:
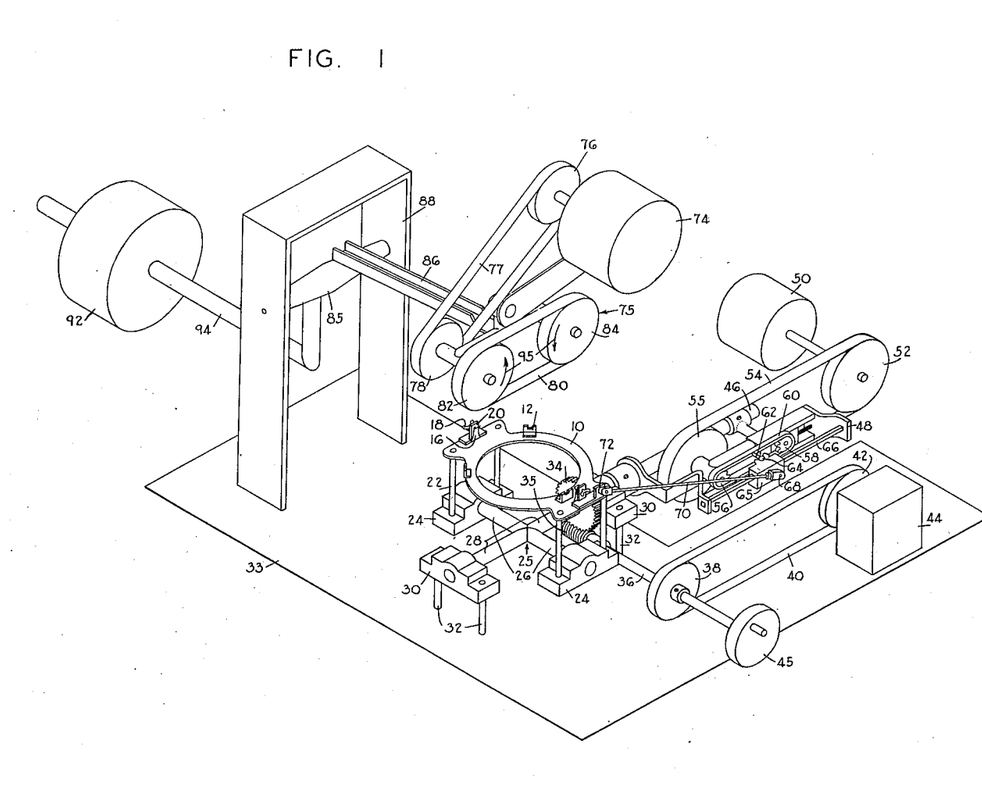
Figure 1 is a perspective view illustrating schematically apparatus for coating a headlight lens in accordance with an embodiment of the invention.
Figure 3:
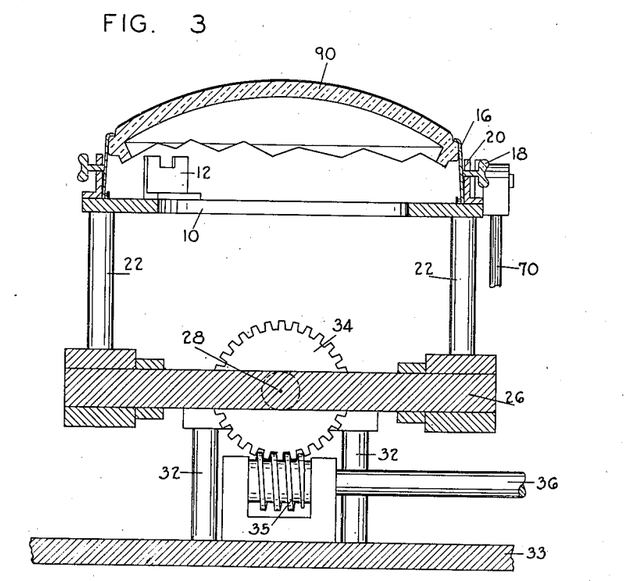
Fig. 3 is a vertical section, partly broken away, illustrating the lens-mounting means of the apparatus shown in Fig. 1 and showing a headlight of the "sealed beam" type mounted therein.

Referring to Fig. 1, element 10 is a holder ring for mounting a lens or headlight of the sealed beam type, as is shown in Fig. 3. Element 10 is preferably provided with a plurality of lugs 12 notched for the reception of locating bosses which are commonly provided on the exterior of the reflector portion of sealed beam headlights, as shown at 14 on headlight 90 in Fig. 9. Said lugs serve both to position the lens or light in a predetermined position and also to insure that the direction of molecular orientation of the coating to be applied will be in the desired direction when the coated light is mounted in an automobile. Alternatively, substantially the same result may be obtained by eliminating lugs 12 and notching the inner portion of ring 10 to receive bosses 14. As is shown in Fig. 3, rim 10 is also provided with a plurality of releasable clamps 16 for securing a lens 90 in position, clamps 16 being controlled in any suitable manner as by set screws 18 mounted in tabs 20.

Ring 10 is mounted by means of a series of rods 22 on a pair of bearings 24 rotatably mounted on opposite ends 26 of a crossed axis shaft 25. Each of the other pair of opposite ends 28 of element 25 is journaled in one of a pair of bearings 30 fixedly mounted by means of pins or rods 32 on base 33. It will be seen that the two axes 26 and 28 constituted by the similarly numbered ends of element 25 intersect at the central point of element 25, and that it is thus possible to rotate holder 10 in either or both of two directions about said central point.

According to the preferred practice of the invention, the two axes about which holder 10 may be rotated should intersect at the center of curvature of a spherically curved lens mounted therein. That is to say, the point of intersection between axes 26 and 28 in shaft element 25 should lie at the center of curvature of a spherically curved lens mounted in rim 10, and this result may be obtained by using rod elements 22 of the proper length. Furthermore, rods 22 are preferably of equal length in order that axis 26 may be parallel to the plane defined by the rim of a lens mounted in holder 10 and to the plane defined by tangents to the center point of said lens.

Separate means are provided for controlling the rotation of holder element 10 and the lens mounted therein about each of axes 26 and 28. One of ends 28 of shaft element 25 has keyed thereon a gear or cog wheel 34 meshing with worm gear 35 on shaft 36. Shaft 36 in turn carries a pulley 38 connected by means of belt 40 to pulley 42, driven through a suitable speed reduction device 44 by a motor, not shown. Means are also shown at 45 for rotating or setting shaft 36 by hand.

One of ends 28 of shaft element 25 is extended at 46 and carries a bracket or frame element 48 having mounted therein means for rocking holder 10 about axis 26. Motor 50, which may be mounted in any suitable way, not shown, drives pulley 52 which is connected by means of belt 54 to pulley 55 mounted in frame 48. Pulley 55 in turn drives one of sprocket wheels 56 and 58 and sprocket chain 60. Chain 60 carries a horizontal pin 62 journaled in a second pin or similar piston-like member 64 mounted for free sliding movement in a vertical slot in crosshead 65. Crosshead 65 is in turn mounted for sliding movement on rod 66 carried by bracket 48, and is pivotally connected at 68 to one end of connecting rod 70, the other end of which is pivoted to a tab 72 on holder 10.

It will be apparent from the foregoing description that when motor 50 is operated to rotate pulley 55, the resulting motion of chain 60 will cause crosshead 65 to reciprocate on rod 66, which, through connecting rod 70, will in turn produce oscillation of holder 10 about axis 26. It will further be seen that this motion will be independent of the rotation of holder 10 about axis 28, provided said rotation is within an arc sufficiently small to prevent undue strain on belt 54. It will be apparent hereinafter that the motion about axis 28 need at the most be through an arc equal to the longest arc which can be drawn through the center of a lens mounted in holder 10. It will further be apparent hereinafter that the oscillation of holder 10 about axis 26 will preferably be very much faster than its motion about axis 28.

The coating head of the apparatus of the invention, that is to say, the means for applying a plastic coating to a lens mounted in holder 10, is indicated generally at 75. Motor 74 drives a pulley 76 which in turn, through belt 77, drives a pulley 78 connected to the coating element. In the embodiment shown in Fig. 1, the coating element comprises a belt 80 running on a pair of pulleys 82 and 84. The entire coating head 75 is connected by means such as channel iron 86 to shaft 85 journaled in frame 88. The head 75 is also provided with counterbalancing means 92 mounted on rod 94 and preferably adjustable thereon in order to regulate the pressure of coating element 80 on a lens mounted in holder 10.

According to the preferred practice of the invention, belt 80 comprises at least in part the organic plastic of which the lens coating is to be made. Materials suitable for this purpose include particularly transparent, linear, high polymeric plastics the molecules of which contain hydroxyl groups, preferred examples being polyvinyl alcohol and polyvinyl acetal. Belt 80 may, for example, comprise a continuous strip of polyvinyl alcohol or may take the form of a rubber belt carrying on its outer side a series of protruding flaps or tabs of polyvinyl alcohol. Alternatively, instead of belt 80 there may be substituted at 82 a wheel or brush made at least in part from polyvinyl alcohol or a similar, suitable plastic. In this connection reference should be had to my co-pending application, Serial No. 371,561, filed December 24, 1940, wherein various other such alternative coating elements are disclosed, and it is to be understood that all such embodiments are to be construed as coming within the scope of this invention and of the claims herein.

Figure 4:
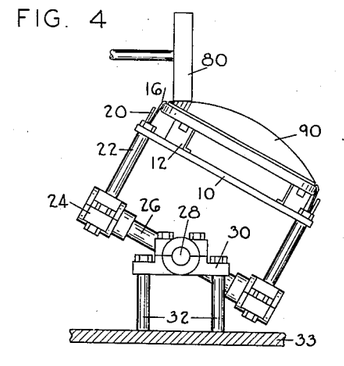
Figs. 4—7 are elevational views similar to Fig. 3 illustrating various positions of the lens-mounting means shown in Fig. 1 during the operation of coating the surface of a spherically curved lens.
Figure 5:
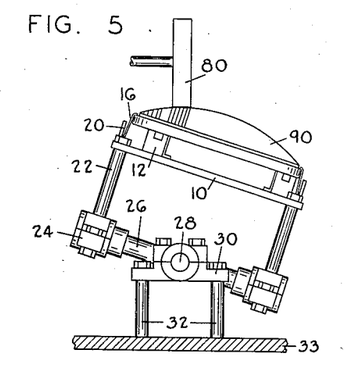
Figure 6:
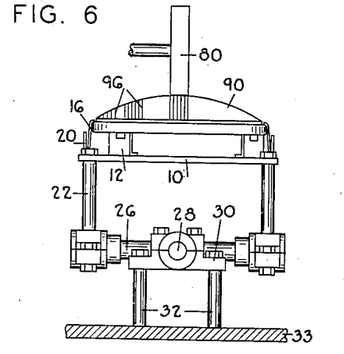
Figure 7:
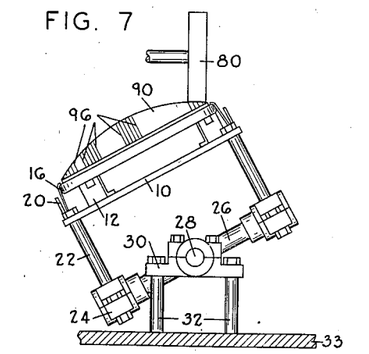

The operation of the apparatus shown in Fig. 1 will be more readily understood by reference to Figs. 3–7. A lens or headlight 90 is mounted in holder 10 by means of clamps 16, and the holder is then rotated on axis 28, as by means of element 45, until it is substantially in the position shown in Fig. 4. That is to say, lens 90 should be in such a position that belt 80 may be lowered into contact with the edge of its surface, as shown in Fig. 4. Motor 74 is then actuated to produce rotation of belt 80, as for example in the direction indicated by arrows 95, and coating head 75 is swung on pivot 85 until belt 80 is in contact with the surface of lens 90. Substantially simultaneously, motor 50 and the motor-actuating shaft 36 should be put into operation in order to produce oscillation of holder 10 on axis 26 and rotation on axis 28.

The respective speeds of the three motions mentioned above are to a considerable extent dependent upon each other and upon the pressure of belt 80 on the lens surface. All four of these quantities may be varied within relatively wide ranges. Generally speaking, it may be stated that the speed of the belt should be substantially greater than the speed of oscillation about axis 26, and that the latter should in turn be substantially greater than the speed of rotation about axis 28. As an illustrative example, belt 80 may move at a rate of 1000 feet per minute, and the surface of lens 90 may oscillate at the rate of a hundred feet per minute. In this case a satisfactory speed for the motion about axis 28 would be approximately 2½ inches per minute, and for these three speeds counterweight 92 may be so adjusted that belt 80 bears against the surface of the lens with a total force of approximately a half pound. It must be emphasized that these values are given solely by way of illustration and that they are all subject to wide variation. Moreover, the range of variation will be increased still further if lens 90 is first subjected to preliminary heating.

It will be seen that during the above described operation, lens 90 will be caused to oscillate relatively rapidly about its center of curvature while in contact with moving belt 80, and will simultaneously be caused to rotate relatively very slowly on an axis perpendicular to the axis whereon it oscillates and also passing through its center of curvature. The result will be that in the course of a single partial rotation from the position shown in Fig. 4 through the positions shown in Figs. 5 and 6 to that shown in Fig. 7, all of the surface of the lens will be brought into contact with moving belt or other coating element 80.

Figure 2:
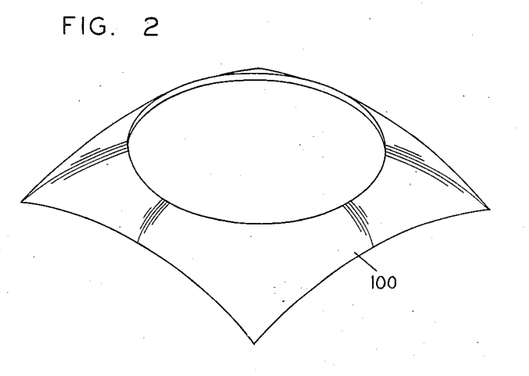
Fig. 2 is a perspective view of an apron element which may be used in the practice of the invention in connection with automobile headlights.

Element 100 shown in Fig. 2 represents a protective shield or apron which may be placed around the rim of lens 90 during the coating operation in order particularly to prevent bouncing or other irregular movement by coating head 75 when belt 80 encounters the edges of the lens rim. It will be apparent that such a shield is preferably spherically curved and has the same radius as the lens it is designed to fit.

As a result of the relatively differing speeds of movement of the lens and belt 80 during this operation, and of the frictional contact therebetween, sufficient local heat is generated at the point of contact to soften the plastic material of the belt. This causes minute particles of the plastic to adhere to the lens surface in a series of strips, as is indicated diagrammatically by the groups of lines 96 in Figs. 4–7. It appears, moreover, that each particle, as it is deposited on the surface, is extended or stretched substantially in the direction of motion of the belt and is caused to coalesce with the other such particles and to adhere to the lens surface in the form of a thin, substantially homogeneous film. Furthermore, the action of stretching the said particles by the belt movement causes the molecules in the particles to orient to substantial parallelism with each other. If the motion of the belt is very much more rapid than that of the movements of the lens, the direction of molecular orientation will be substantially parallel to the direction of motion of the belt, but in any case the said direction of orientation will be substantially parallel to a plane passing through the center of the lens and its center of curvature. Thus if the lens is viewed from substantially directly in front, as it normally is when in position on an automobile, the direction of orientation will appear to be in a series of substantially parallel planes, as is indicated by lines 98 in Figs. 8 and 9.

It will now be apparent from the foregoing description that the method of the invention comprises essentially the forming of a predeterminedly molecularly oriented plastic coating on a spherically curved surface by depositing particles of said plastic on said surface in a series of contiguous, parallel and partially overlapping strips, causing said particles and strips to coalesce and form a substantially homogeneous film or layer, causing said layer to bond itself to said surface, and orienting the molecules in said layer to substantial parallelism in a predetermined direction. In the case of headlight lenses, it will be seen that the preferred direction of molecular orientation will be parallel to the traces on the surface of the lens of a multiplicity of parallel planes one of which traverses the center of said lens and its center of curvature. It should further be pointed out that in its preferred embodiment the method of the invention combines the above four steps into a substantially simultaneous operation, comprising pressing a mass of the desired plastic, such as the above described belt of polyvinyl alcohol, into contact with the surface to be coated and producing relative motion between the plastic and the surface in such directions and with such speed that sufficient heat is generated at the point of contact between the plastic and the surface to produce the above results. If it is not convenient to generate the necessary heat by controlling said speed and pressure, substantially the same results may be obtained by applying additional heat to the surface to be coated.

The apparatus described above and shown in the accompanying drawings provides convenient means for practicing the method of the invention. It should be understood, however, that said apparatus is subject to substantial variation and that the method may be practiced by means of many other mechanisms besides said apparatus. For example, the method may be practiced by merely stroking a lens surface with a mass of polyvinyl alcohol held in the hand of the operator, particularly if additional heat is applied to the lens, although it will be obvious that the results achieved thereby would necessarily be somewhat crude and non-uniform.

The particular object of the apparatus of the invention is to provide convenient means for practicing the method of the invention and to achieve uniform results thereby. Many variations may be made therein without departing from the scope of the invention, as for example, the substitution of a stationary mass of polyvinyl alcohol or other such plastic in place of the moving belt 80 shown in Fig. 1. As has been pointed out, such a substitution would necessitate compensation in the speed of oscillation of the holder 10 about axis 26 and probably also in the pressure of the coating head on a lens in holder 10, but otherwise the essentials of the invention would remain substantially unchanged.

Figure 8:
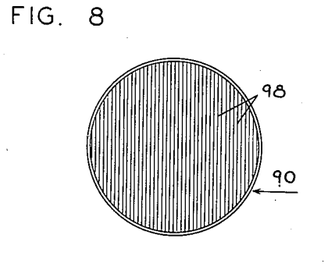
Fig. 8 is a front view illustrating diagrammatically the surface of a spherically curved lens, such as the lens of a "sealed beam" headlight, in accordance with the practice of the invention.

It should be pointed out that in practicing the method of the invention and in the construction of apparatus for its practice, there are certain important requirements which should be fulfilled in order to produce uniform molecular orientation in the directions indicated in Figs. 8 and 9. The most important of these requirements is that axes 26 and 28 should be perpendicular to each other and should intersect at the center of curvature of a spherically curved lens mounted in holder 10. It will also be seen that axis 26 should be parallel to the plane of the rim of the lens being coated and to the plane defined by tangents to the center thereof. Axis 28 should in turn be substantially perpendicular to a radius drawn to the center of the area of contact between the lens surface and the belt or other coating element. It will be seen further that when holder 10 is at the midpoint of the arc through which it oscillates about axis 26, as for example in the positions shown in Figs. 3–7, axis 28 will be substantially parallel to the plane of the rim of the lens being coated and perpendicular to a radius drawn to the center thereof.

It is to be noted that the preferred position of axis 28 is substantially parallel to the direction of traverse of belt 80 or substantially parallel to a tangent drawn from the center of the area of contact between the coating element and the lens in the plane of rotation of such a coating element. In this arrangement, and in view of the relatively great difference between the speed of motion on axis 28 with respect to the speeds of oscillation and belt traverse, the molecules of the plastic coating will be oriented to substantial parallelism with axis 28. In this connection it should particularly be noted that the worm drive indicated at 34 and 35 may advantageously be replaced by an escapement mechanism synchronized in such a way with the mechanism operating the oscillating movement that the motion on axis 28 will take place at one end of an oscillating stroke. With such an arrangement the molecules would be substantially uniformly oriented to parallelism with axis 28 in the direction of traverse of belt 80.

Aother way in which the above apparatus may be modified without substantial alteration of the method of the invention is to substitute an oscillating mounting for coating head 75 in place of the rotatable mounting of holder 10. The operation of such mechanism would be substantially the same as that of the apparatus illustrated, but such a construction is not preferred for the reason that it tends to produce undue bouncing or other oscillating movement of the coating element.

It should be pointed out that the above apparatus may be modified relatively easily in order to practice the method of the invention in connection with non-planar surfaces other than those spherically curved. Such modifications need not necessarily involve more than a rearrangement of axes 26 and 28 such that each will pass through the center of curvature of such a surface in a direction substantially parallel thereto. For example, if the surface to be coated were in the shape of a segment of a torus, axis 26 should pass through the center of curvature of a cross-section of the torus, and axis 28 should pass through the center of curvature of the torus as a whole. It will be understood that all similar such modifications are to be construed as coming within the scope of the invention and of the claims herein.

As has already been pointed out above, a coating of polyvinyl alcohol or similar plastic applied in accordance with the present invention may easily be converted into a light polarizer by incorporating therewith a dichroic dye or stain, or for example by treating said coating in accordance with United States Patent No. 2,173,304. It should also be pointed out that the above described apparatus may be utilized in connection with spherically curved lenses which already have thereon a heterogeneously oriented plastic coating. For example, the headlight lens may initially be coated with a material such as polyvinyl alcohol by softening a sheet of said material and pressing it into contact with the lens or by casting such a coating directly thereon from solution. The molecules of said coating, or at least the molecules on the surface thereof, may then be oriented to substantial parallelism by substituting a friction element such as a steel or fibre belt for plastic belt 80 herein and using the apparatus in the same manner in which it is used to orient the molecules in the above described method of this invention. The resulting oriented coating may then be converted into a light polarizer in the same way as a coating applied in accordance with this invention.

Since certain changes in carrying out the above method and certain modifications in the apparatus which embody the invention may be made without departing from its scope, it is intended that all matter contained in the above description shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. Apparatus for coating a non-planar surface, comprising, in combination, holder means for an element having a non-planar surface, means for pivotally mounting said holder means for motion about a predetermined axis, means for pivotally mounting said mounting means for motion about an axis substantially perpendicular to said first named axis, means for oscillating said holder means on said first named axis, means for simultaneously moving said mounting means on said second named axis, means providing a coating element, and means for causing said coating element to bear with relatively even force against the surface of an element held in said holder means.

2. Apparatus for coating a non-planar surface, comprising, in combination, holder means for an element having a non-planar surface, means for pivotally mounting said holder means for motion about a predetermined axis, means for pivotally mounting said mounting means for motion about an axis substantially perpendicular to said first named axis, means for oscillating said holder means on said first named axis at a predetermined speed, means for simultaneously moving said mounting means on said second named axis at a speed substantially less than the speed of motion of said holder means, means providing a coating element, and means for causing said coating element to bear with relatively even force against the surface of an element held in said holder means.

3. Apparatus for coating a non-planar surface, comprising, in combination, holder means for predeterminedly positioning an element having a non-planar surface, means for pivotally mounting said holder means for motion about a predetermined axis, said axis being parallel, when said element is positioned in said holder, to the plane defined by tangents to the center of said surface and passing through the center of curvature of said surface in a direction parallel thereto, means for oscillating said holder means on said axis, means for simultaneously moving said holder means and the element mounted therein about an axis perpendicular to said first named axis, said second named axis passing through the center of curvature of said surface in a direction parallel thereto and being substantially parallel to the plane defined by tangents to the center point of said surface when said holder means is at the midpoint of the arc through which it oscillates, means providing a coating element, and means for causing said coating element to bear with relatively even force against the surface of an element held in said holder means.

4. Apparatus for coating a non-planar surface, comprising, in combination, holder means for predeterminedly positioning an element having a non-planar surface, means for pivotally mounting said holder means for motion about a predetermined axis, said axis being parallel, when said element is positioned in said holder, to the plane defined by tangents to the center of said surface and passing through the center of curvature of said surface in a direction parallel thereto, means for oscillating said holder means at a predetermined speed on said axis, means for simultaneously moving said holder means and the element mounted therein at a speed substantially less than said first mentioned speed and about an axis perpendicular to said first named axis, said second named axis passing through the center of curvature of said surface in a direction parallel thereto and being substantially parallel to the plane defined by tangents to the center point of said surface when said holder means is at the midpoint of the arc through which it oscillates, means providing a coating element, and means for causing said coating element to bear with relatively even force against the surface of an element held in said holder means.

5. Apparatus for coating a non-planar surface, comprising, in combination, holder means for predeterminedly positioning an element having a non-planar surface, means for pivotally mounting said holder means for motion about a predetermined axis, said axis being parallel, when said element is positioned in said holder, to the plane defined by tangents to the center of said surface and passing through the center of curvature of said surface in a direction parallel thereto, means for oscillating said holder means at a predetermined speed on said axis, means for simultaneously moving said holder means and the element mounted therein at a speed substantially less than said first mentioned speed and about an axis perpendicular to said first named axis, said second named axis passing through the center of curvature of said surface in a direction parallel thereto and being substantially parallel to the plane defined by tangents to the center point of said surface when said holder means is at the midpoint of the arc through which it oscillates, means providing a coating element, means for moving said coating element with respect to said holder, and means for causing said coating element to bear with relatively even force against the surface of an element held in said holder means.

6. Apparatus for coating a spherically curved surface, comprising, in combination, holder means for predeterminedly positioning an element having a spherically curved surface, means for pivotally mounting said holder means for motion about a predetermined axis, said axis passing through the center of curvature of the surface of a spherically curved element held in said holder means and being parallel to the plane defined by tangents to the center of the surface of said element, means for oscillating said holder means on said axis at a predetermined speed, means for simultaneously moving said holder means about an axis perpendicular to said first named axis and coinciding therewith at said center of curvature at a speed substantially less than the speed of oscillation of said holder means, means providing a coating element, and means for causing said coating element to bear with relatively even force against the surface of an element held in said holder means.

7. Apparatus for coating a spherically curved surface, comprising, in combination, holder means for predeterminedly positioning an element having a spherically curved surface, means for pivotally mounting said holder means for motion about a predetermined axis, said axis passing through the center of curvature of the surface of a spherically curved element held in said holder means and being parallel to the plane defined by tangents to the center of the surface of said element, means for oscillating said holder means on said axis at a predetermined speed, means for simultaneously moving said holder means about an axis perpendicular to said first named axis and coinciding therewith at said center of curvature at a speed substantially less than the speed of oscillation of said holder means, means providing a coating element, means for moving said coating element with respect to said holder, and means for causing said coating element to bear with relatively even force against the surface of an element held in said holder means.

8. Apparatus for coating the surface of a spherically curved lens comprising, in combination, holder means for predeterminedly positioning said lens, means for pivotally mounting said holder means for motion about a predetermined axis, said axis passing through the center of curvature of said mounted lens and being parallel to the plane of the rim thereof, means providing a coating element, means for causing said coating element to bear with relatively even force against the surface of said lens, means for oscillating said holder means through an angle at least substantially that subtended by the rim of said lens, and means for simultaneously moving said lens about an axis perpendicular to said first named axis and coinciding therewith at the center of curvature of said lens.

9. Apparatus comprising, in combination, holder means for predeterminedly positioning a lens, means for oscillating said holder means relatively rapidly about a predetermined axis, said axis passing through the center of curvature of a spherically curved lens held in said holder means and being parallel to the plane of the rim of said lens, means for simultaneously moving said holder means relatively slowly about an axis perpendicular to said first named axis and intersecting therewith at said center of curvature of said lens, means providing an element to be brought into contact with the surface of said lens, means for moving said element with respect to said holder, and means for causing said element to bear with relatively even force against the surface of said lens.

10. Apparatus comprising, in combination, holder means for predeterminedly positioning a lens, means for oscillating said holder means relatively rapidly about a predetermined axis, said axis passing through the center of curvature of a spherically curved lens held in said holder means and being parallel to the plane of the rim of said lens, means for simultaneously moving said holder means relatively slowly about an axis perpendicular to said first named axis and intersecting therewith at said center of curvature of said lens, means providing an element adapted to bear against the surface of said lens, said second named axis being substantially perpendicular to a radius drawn to the center of the area of contact between said element and said lens surface, means for moving said element with respect to said holder, and means for causing said element to bear with relatively even force against the surface of said lens.

11. Apparatus for applying to a non-planar surface a predeterminedly oriented coating, comprising, in combination, holder means for predeterminedly positioning an element having a non-planar surface, means for rocking said holder means relatively rapidly on a predetermined axis, means for simultaneously moving said holder means about a predetermined axis perpendicular to said first named axis, means providing a coating element comprising at least in part the material to be coated on said surface, and means for causing said coating element to bear with relatively even force against the surface of an element held in said holder means.

12. Apparatus for applying to a spherically curved surface a predeterminedly oriented coating, comprising, in combination, holder means for predeterminedly positioning an element having a spherically curved surface to be coated, means providing a coating element comprising at least in part the material to be coated on said surface, means for causing said coating element to bear with relatively even force against the surface of an element held in said holder means, means for rocking said holder means on a predetermined axis while the surface of an element held therein is in contact with said coating element, said axis passing through the center of curvature of said surface, and means for simultaneously moving said holder means at a predeterminedly different speed about an axis perpendicular to said first named axis and intersecting therewith at said center of curvature of said surface.

13. Apparatus for applying to a spherically curved surface a predeterminedly oriented coating, comprising, in combination, holder means for predeterminedly positioning an element having a spherically curved surface to be coated, means providing a coating element comprising at least in part the material to be coated on said surface, means for causing said coating element to bear with relatively even force against the surface of an element held in said holder means, means for moving said coating element with respect to said lens surface, means for rocking said holder means on a predetermined axis while the surface of an element held therein is in contact with said coating element, said axis passing through the center of curvature of said surface, and means for simultaneously moving said holder means at a predeterminedly different speed about an axis perpendicular to said first named axis and intersecting therewith at said center of curvature of said surface.

14. Apparatus for applying to the surface of a spherically curved lens a coating comprising an organic plastic having its molecules oriented to substantial parallelism, said apparatus comprising, in combination, holder means for predeterminedly positioning said lens, means providing a coating element comprising at least in part said organic plastic, means providing relative motion between said coating element and said lens, means for causing said coating element to bear with relatively even force against the surface of said lens, means for rocking said lens relatively rapidly on a predetermined axis with the surface of said lens in contact with said coating element, said axis passing through the center of curvature of said lens and being parallel to the plane of the rim thereof, and means for simultaneously moving said lens relatively slowly about an axis perpendicular to said first named axis and intersecting therewith at said center of curvature of said lens, said second named axis being substantially perpendicular to a radius drawn to the center of the area of contact between said coating element and the surface of said lens.

15. Apparatus for applying to the surface of a spherically curved lens a coating comprising an organic plastic having its molecules oriented to substantial parallelism, said apparatus comprising, in combination, holder means for predeterminedly positioning said lens, means providing a coating element comprising at least in part said organic plastic, means providing relative motion between said coating element and said lens, means for causing said coating element to bear with relatively even force against the surface of said lens, means for rocking said lens relatively rapidly on a predetermined axis with the surface of said lens in contact with said coating element, said axis passing through the center of curvature of said lens and being parallel to the plane of the rim thereof, and means for simultaneously moving said lens relatively slowly about an axis perpendicular to said first named axis and intersecting therewith at said center of curvature of said lens, said second named axis being substantially parallel to the direction of molecular orientation of said coating when said lens is at substantially the midpoint of the arc through which it rocks.

16. Apparatus for applying to the surface of a spherically curved lens a coating comprising an organic plastic having its molecules oriented to substantial parallelism, said apparatus comprising, in combination, holder means for predeterminedly positioning said lens, means providing a coating element comprising at least in part a transparent, linear, high polymeric plastic the molecules of which contain hydroxyl groups, means providing relative motion between said coating element and said lens, means for causing said coating element to bear with relatively even force against the surface of said lens, means for rocking said lens relatively rapidly on a predetermined axis with the surface of said lens in contact with said coating element, said axis passing through the center of curvature of said lens and being parallel to the plane of the rim thereof, and means for simultaneously moving said lens relatively slowly about an axis perpendicular to said first named axis and intersecting therewith at said center of curvature of said lens, said second named axis being substantially perpendicular to a radius drawn to the center of the area of contact between said coating element and the surface of said lens.

17. Apparatus for applying to the surface of a spherically curved lens a coating comprising an organic plastic having its molecules oriented to substantial parallelism, said apparatus comprising, in combination, holder means for predeterminedly positioning said lens, means providing a coating element comprising at least in part an organic plastic of the class consisting of polyvinyl alcohol and polyvinyl acetal, means providing relative motion between said coating element and said lens, means for causing said coating element to bear with relatively even force against the surface of said lens, means for rocking said lens relatively rapidly on a predetermined axis with the surface of said lens in contact with said coating element, said axis passing through the center of curvature of said lens and being parallel to the plane of the rim thereof, and means for simultaneously moving said lens relatively slowly about an axis perpendicular to said first named axis and intersecting therewith at said center of curvature of said lens, said second named axis being substantially perpendicular to a radius drawn to the center of the area of contact between said coating element and the surface of said lens.

18. Apparatus for coating the surface of a spherically curved lens with substantially molecularly oriented polyvinyl alcohol, said apparatus comprising, in combination, holder means for predeterminedly positioning said lens, means providing a relatively rapidly moving, continuous belt comprising at least in part polyvinyl alcohol, means for causing said belt to bear with relatively even force against the surface of said lens, means for rocking said lens relatively rapidly on a predetermined axis with the surface of said lens in contact with said belt, said axis passing through the center of curvature of said lens and being parallel to the plane of the rim thereof, and means for simultaneously moving said lens relatively slowly about an axis perpendicular to said first named axis and intersecting therewith at said center of curvature of said lens, said second named axis being substantially perpendicular to a radius drawn to the center of the area of contact between said belt and the surface of said lens.

19. Apparatus for coating the surface of a spherically curved lens with substantially molecularly oriented polyvinyl alcohol, said apparatus comprising, in combination, holder means for predeterminedly positioning said lens, means providing a relatively rapidly moving, continuous belt comprising at least in part polyvinyl alcohol, means for causing said belt to bear with relatively even force against the surface of said lens, means for rocking said lens relatively rapidly on a predetermined axis with the surface of said lens in contact with said belt, said axis passing through the center of curvature of said lens and being parallel to the plane of the rim thereof, and means for simultaneously moving said lens relatively slowly about an axis perpendicular to said first named axis and intersecting therewith at said center of curvature of said lens, said second named axis being substantially parallel with the direction of traverse of said belt on the surface of said lens.

20. Apparatus for coating a non-planar surface, comprising, in combination, holder means for an element having a non-planar surface, means for pivotally mounting said holder means for motion about a predetermined axis, means for pivotally mounting said mounting means for motion about an axis substantially perpendicular to said first named axis, means for oscillating said holder means on said first named axis, means for simultaneously moving said mounting means on said second named axis, means providing a coating element, means for causing said coating element to bear with relatively even force against the surface of an element held in said holder means, means for supporting said coating element, means for pivotally mounting said supporting means, and means for counterbalancing said coating element.

21. In a method of forming on a spherically curved surface a coating comprising a thermoplastic, organic plastic having its molecules oriented to substantial parallelism, the steps comprising depositing on said surface a multiplicity of contiguous and at least partially overlying areas of said plastic, and orienting the molecules within said areas to substantial parallelism with the traces formed on said surface by a multiplicity of parallel planes one of which traverses the center of said surface and the center of curvature thereof.

22. In a method of forming on a spherically curved surface a coating comprising a thermoplastic, organic plastic having its molecules oriented to substantial parallelism, the steps comprising depositing on said surface a multiplicity of contiguous and at least partially overlying areas of said plastic, orienting the molecules within said areas to substantial parallelism with the traces formed on said surface by a multiplicity of parallel planes one of which traverses the center of said surface and the center of curvature thereof, and causing said areas to coalesce and form a substantially homogeneous layer.

23. In a method of forming on a spherically curved surface a coating comprising a thermoplastic, organic plastic having its molecules oriented to substantial parallelism, the steps comprising depositing on said surface a multiplicity of contiguous and at least partially overlying areas of said plastic, orienting the molecules within said areas to substantial parallelism with the traces formed on said surface by a multiplicity of parallel planes one of which traverses the center of said surface and the center of curvature thereof, and causing said areas to coalesce and bond to said surface in a substantially homogeneous layer.

24. In a method of forming on a spherically curved surface a coating comprising a thermoplastic, organic plastic having its molecules oriented to substantial parallelism, the steps comprising depositing on said surface a multiplicity of contiguous and at least partially overlying areas of said plastic, causing said areas to coalesce and form a substantially homogeneous layer, and simultaneously orienting the molecules therein to substantial parallelism with the traces formed on said surface by a multiplicity of parallel planes one of which traverses the center of said surface and the center of curvature thereof.

25. In a method of forming on a spherically curved surface a coating comprising a thermoplastic, organic plastic having its molecules oriented to substantial parallelism, the steps comprising successively depositing on said surface a multiplicity of particles of said plastic in a series of substantially contiguous strips, orienting the molecules within said particles to substantial parallelism with the traces formed on said surface by a multiplicity of parallel planes one of which traverses the center of said surface and the center of curvature thereof, and causing said particles to coalesce and form a substantially homogeneous layer.

26. In a method of forming on a spherically curved surface a coating comprising a thermoplastic, organic plastic having its molecules oriented to substantial parallelism, the steps comprising successively depositing on said surface a multiplicity of particles of said plastic in a series of substantially contiguous strips, causing said particles to coalesce and form a substantially homogeneous layer and simultaneously orienting the molecules therein to substantial parallelism with the traces formed on said surface by a multiplicity of parallel planes one of which traverses the center of said surface and the center of curvature thereof.

27. In a method of forming on a spherically curved surface a coating comprising a thermoplastic, organic plastic having its molecules oriented to substantial parallelism, the steps comprising successively depositing on said surface a multiplicity of particles of said plastic in a series of substantially contiguous strips, orienting the molecules within said particles to substantial parallelism with the traces formed on said surface by a multiplicity of parallel planes one of which traverses the center of said surface and the center of curvature thereof, and generating sufficient local heat at the point of deposit of said particles to cause said particles to coalesce and form a substantially homogeneous layer.

28. In a method of forming on the surface of a spherically curved lens a coating comprising a thermoplastic, organic plastic having its molecules oriented to substantial parallelism, the steps comprising pressing a mass of said plastic into contact with the surface of said lens, and producing relative movement between said lens surface and said plastic under such conditions of relative speed, direction and pressure that particles of said plastic are caused to adhere to said lens surface in a series of substantially contiguous areas and the molecules of said plastic are simultaneously oriented to substantial parallelism with the traces formed on said surface by a multiplicity of parallel planes one of which traverses the center of said surface and the center of curvature thereof.

29. In a method of forming on the surface of a spherically curved lens a coating comprising a thermoplastic, organic plastic having its molecules oriented to substantial parallelism, the steps comprising pressing a mass of said plastic into contact with the surface of said lens, and producing relative movement between said lens surface and said plastic under such conditions of relative speed, direction and pressure that particles of said plastic are caused to adhere to said lens surface in a series of substantially contiguous areas and to coalesce and form a substantially homogeneous layer and that the molecules in said layer are simultaneously oriented to substantial parallelism with the traces formed on said surface by a multiplicity of parallel planes one of which traverses the center of said surface and the center of curvature thereof.

30. In a method of forming on the surface of a spherically curved lens a coating comprising a thermoplastic, organic plastic having its molecules oriented to substantial parallelism, the steps comprising pressing a mass of said plastic into contact with the surface of said lens, moving said plastic continuously in a predetermined direction, simultaneously moving said lens in a direction at a predetermined angle to the direction of motion of said plastic, and so maintaining the speeds of said motions and the pressure between said plastic and said lens surface that particles of said plastic are caused to adhere to said lens surface and the molecules of said deposited plastic particles are simultaneously oriented to substantial parallelism with the traces formed on said surface by a multiplicity of parallel planes one of which traverses the center of said surface and the center of curvature thereof.

31. In a method of forming on the surface of a spherically curved lens a coating comprising a thermoplastic, organic plastic having its molecules oriented to substantial parallelism, the steps comprising pressing a mass of said plastic into contact with the surface of said lens, moving said plastic continuously in a predetermined direction, simultaneously moving said lens in a direction at a predetermined angle to the direction of motion of said plastic, and so maintaining the speeds of said motions and the pressure between said plastic and said lens surface that particles of said plastic are caused to adhere to said lens surface and to coalesce and form a substantially homogeneous strip and that the molecules therein are simultaneously oriented to substantial parallelism with the traces formed on said surface by a multiplicity of parallel planes one of which traverses the center of said surface and the center of curvature thereof.

32. In a method of forming on the surface of a spherically curved lens a coating comprising a thermoplastic, organic plastic having its molecules oriented to substantial parallelism, the steps comprising pressing a mass of said plastic into contact with the surface of said lens, moving said plastic continuously in a predetermined direction, simultaneously rotating said lens in a predetermined direction on an axis passing through the center of curvature thereof, and so maintaining the speeds of said motions and the pressure between said plastic and said lens surface that particles of said plastic are caused to adhere to said lens surface and the molecules of said deposited plastic particles are simultaneously oriented to substantial parallelism with the traces formed on said surface by a multiplicity of parallel planes one of which traverses the center of said surface and the center of curvature thereof.

33. In a method of forming on the surface of a spherically curved lens a coating comprising a thermoplastic, organic plastic having its molecules oriented to substantial parallelism, the steps comprising pressing a mass of said plastic into contact with the surface of said lens, moving said plastic continuously in a predetermined direction, simultaneously rotating said lens in a predetermined direction on an axis passing through the center of curvature thereof and oscillating said lens about an axis substantially perpendicular to said first named axis and coinciding therewith at the center of curvature of the surface of said lens, and so maintaining the speeds of said motions and the pressure between said plastic and said lens surface that particles of said plastic are caused to adhere to said lens surface and the molecules of said deposited plastic particles are simultaneously oriented to substantial parallelism with the traces formed on said surface by a multiplicity of parallel planes one of which traverses the center of said surface and the center of curvature thereof.

34. In a method of forming on the surface of a spherically curved lens a coating comprising a thermoplastic, organic plastic having its molecules oriented to substantial parallelism, the steps comprising pressing a mass of said plastic into contact with the surface of said lens, moving said plastic continuously in a predetermined direction, simultaneously rotating said lens in a predetermined direction on an axis passing through the center of curvature thereof and oscillating said lens about an axis substantially perpendicular to said first named axis and coinciding therewith at the center of curvature of the surface of said lens, said axis of oscillation being substantially parallel to a tangent drawn to the center of the area of contact between said plastic and the surface of said lens, and so maintaining the speeds of said motions and the pressure between said plastic and said lens surface that particles of said plastic are caused to adhere to said lens surface and the molecules of said deposited plastic particles are simultaneously oriented to substantial parallelism with the traces formed on said surface by a multiplicity of parallel planes one of which traverses the center of said surface and the center of curvature thereof.

35. In a method of forming on the surface of a spherically curved lens a coating comprising a thermoplastic, organic plastic having its molecules oriented to substantial parallelism, the steps comprising pressing a mass of said plastic into contact with the surface of said lens, moving said plastic continuously in a predetermined direction, simultaneously oscillating said lens on a predetermined axis passing through the center of curvature thereof, and so maintaining the speeds of said motions and the pressure between said plastic and said lens surface that particles of said plastic are caused to adhere to said lens surface and the molecules of said deposited plastic particles are simultaneously oriented to substantial parallelism with the traces formed on said surface by a multiplicity of parallel planes one of which traverses the center of said surface and the center of curvature thereof.

HOWARD G. ROGERS.